March 16, 1954
W. A. GUNDERSON
2,672,116
HYDRAULIC SHIFT INDICATOR
Filed May 20, 1950
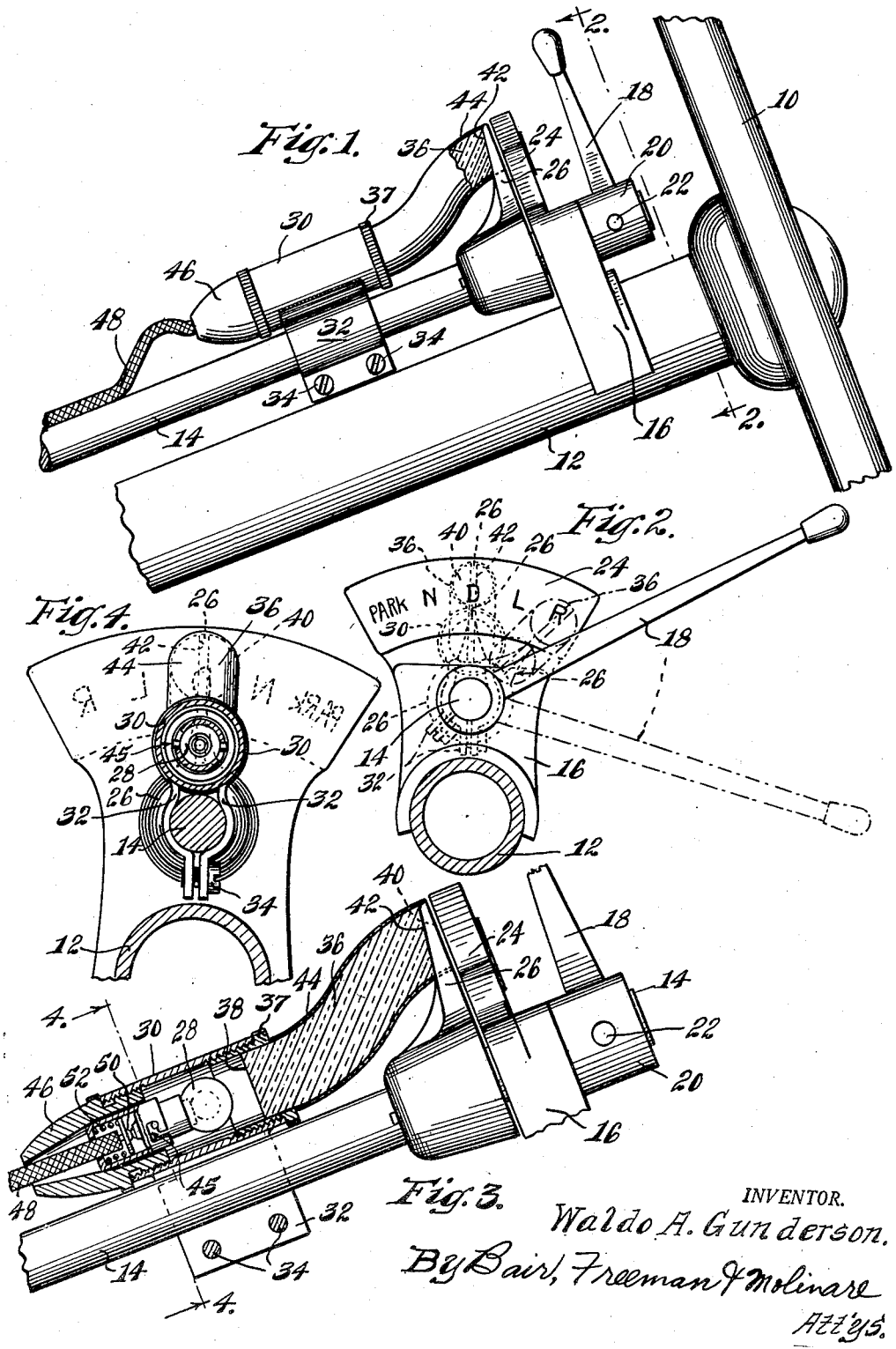
INVENTOR.
Waldo A. Gunderson.
By Bair, Freeman & Molinare
Att'ys.

Patented Mar. 16, 1954

2,672,116

UNITED STATES PATENT OFFICE 2,672,116

HYDRAULIC SHIFT INDICATOR

Waldo Andrew Gunderson, Berwyn, Ill., assignor of one-half to Henry Krev, Berwyn, Ill.

Application May 20, 1950, Serial No. 163,207

2 Claims. (Cl. 116—124)

This invention relates to an indicating device and more particularly to an illuminating means for a hydraulic shift indicator used with a hydraulic shift control of the type generally found on automobiles.

One development of present day automobiles that is rapidly becoming more popular is the substitution of the so-called hydraulic drive for the more conventional gear drive. This increase in popularity is in part due to the elimination of a great amount of shifting during the forward direction driving operation. However, not all the shifting was eliminated as it is necessary in ordinary circumstances to provide certain other driving operations, not all of which can be obtained on a single control setting of an automatic or hydraulic drive. Thus, for example, an automobile must still be able to be put into reverse, or into a high torque low-speed, or into a neutral position where the engine may be fed more fuel without corresponding movement of the automobile.

To provide for these various demands, a shifting device is provided in automobiles for use with the hydraulic drive. This shifting device consists of a control shaft, a handle for actuating the control shaft and indicating means for showing the position of the control. This indicating means usually includes a pointer fixed to the control shaft, and printed indicia of the positions on some stationary member.

Another reason for the introduction of the hydraulic drive was that many people, especially those who had never driven an automobile, had difficulty learning to synchronize the steering, accelerating, braking, clutching and shifting operations necessary in driving an automobile. The use of the H type gear shift also was a difficult thing for beginners to master since they had to memorize the positions of the various speeds. With the hydraulic drive, the clutch is eliminated and the beginner can set the control shaft at the driving operation desired by setting the pointer opposite the corresponding indicia. Then, all that is needed to drive is to steer, accelerate, or brake.

The control shaft of these hydraulic drive automobiles is usually designed to be actuated through a relatively small arc, in which arc are located about four or five distinct positions representing different operations of the car. Because of the fact that the positions of the hydraulic-drive control shaft are located within a small arc, these positions are necessarily close to one another and the "feel" of what position the control shaft is in, is lost to some degree.

The elimination of the H type gear shift to a system which is in part based upon visual observation of an indicating device, although designed to make the operation of an automobile simpler, has actually eliminated, to some degree, the "feel" of the operator as to what driving position the automobile is in.

Thus, in the operation of an automobile at night, when visual observation of the indicating system is most difficult, the sense or "feel" as to the position of the control shaft, upon which the operator often relies is missing. It is very essential with hydraulic drive systems that the operator know exactly what position the control shaft is in, for lack of knowledge may be very dangerous. For example, a hydraulic drive automobile will actually be stationary when the control shaft is in the drive position, with the motor idling. Since there is no clutch, a mere increase in speed of the motor is sufficient to send the car forward. Accidents have already been recorded where people have stepped out of hydraulic drive automobiles, walked around to the front of the automobile, and then have been struck down by the automobile moving forward by reason of the motor's idling rate having been set high, or by reason of some accidental acceleration of the motor, as might occur by some passenger's foot being placed upon the gas pedal.

Thus, one of the objects of this invention is to provide a novel indicating device which will at all times, including during night driving, clearly indicate visually the position of the hydraulic-drive control shaft.

Another object of this invention is to provide a novel device for illuminating at night the indicating means of a hydraulic-drive control so that an operator may quickly and easily note the position of the control shaft without recourse to close inspection of the indicating means.

A further object of this invention is to provide an illuminating means for a hydraulic-drive control indicator, which illuminating means will not glare or disturb an operator.

A still further object of this invention is to provide a simple and inexpensive illuminating means for a hydraulic drive control indicator, which illuminating means is easily adaptable to existing hydraulic drive control systems.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which—

Figure 1 is a side elevational view of parts of the steering apparatus and hydraulic drive control apparatus of an automobile with my invention installed thereon.

Figure 2 is an endwise view of a portion of the apparatus shown in Figure 1 and is taken on line 2—2 of Figure 1.

Figure 3 is taken from the same aspect as Figure 1, and is an enlarged cross sectional view of my invention and of the adjacent existing structure.

Figure 4 is an end view partly in cross section of the structure shown in Figure 3 and is taken on line 4—4 of Figure 3.

Referring now to Figure 1, there is shown a portion of the steering controls of a typical automobile, and portions of the hydraulic shift control positioned adjacent to the steering controls. More particularly, a steering wheel 10 is shown mounted on a steering post 12. A hydraulic shift control shaft 14 lies substantially parallel to and spaced from the steering post 12. This hydraulic shift control shaft 14 is journalled adjacent its upper end in a bracket 16, which bracket is mounted on the steering post 12. A control lever 18 is secured to the upper end of hydraulic shift control shaft 14 by means of a collar 20 and a set screw 22.

Mounted on the bracket 16 is an indicating dial 24 which has printed thereon, indicia for the various positions of the hydraulic shift control shaft 14. The indicia for the positions are most clearly shown in Figure 2.

The positions on the indicating dial 24 are Park, N, D, L, and R, the N, D, L, and R indicating respectively neutral, drive, low, and reverse, and the Park indicating a lock position in the hydraulic system. This indicating dial 24 is usually made of a transparent plastic so that the operator of the automobile may view an indicating finger through said indicating dial. Mounted on the hydraulic shift control shaft 14 and rotatable therewith is an indicating finger 26. This indicating finger 26 is so positioned on hydraulic shift control shaft 14 that when the shaft 14 is shifted to the various positions, the finger 26 indicates the position of shaft 14 by pointing to one of the indicia printed on the indicating dial 24.

To provide illuminating means for illuminating the indicating finger 26 and the indicia on indicating dial 24, I have provided a light bulb 28 which is mounted in a tubular housing 30 as best shown in Figures 1 and 4. The tubular housing 30 is mounted on hydraulic shift control shaft 14 by means of clamp 32 and bolts 34. The clamp 34 may be connected to tubular housing 30 by any well known means, such as by welding.

Extending from one end of tubular housing 30 is a translucent member 36 which may be formed of some plastic such as Lucite. This translucent member 36 is generally of cylindrical form. One face 38 of translucent member 36 is exposed to the light bulb 28. The opposite face 40 at the extended end of translucent member 36 is positioned adjacent the indicating dial 24. The translucent member 36 is bent to the form shown so that face 40 is positioned directly behind the indicating indicia so as to best illuminate the indicating indicia. The extended end of translucent member 36 has a recess 42 cut therein which is adapted to receive the tip of indicating finger 26 therein. The recess 42 cooperates with finger 26 to position translucent member 36 so that face 40 lies as close as possible to indicating dial 24 and so that the finger 26 and the face 40 are maintained in position relative to each other.

In order to eliminate all illumination other than that at face 40 of translucent member 36, the translucent member 36 may be covered along its entire length by a suitable opaque wrapping 44. If desired, the translucent member 36 may be colored a suitable color that is pleasing and easy on the eyes, thus easing eye strain which might accompany any illumination which is continuously before the driver's eyes.

The light bulb 28 is a typical light bulb that is used in the automotive industry and is mounted by means of a bayonet type mounting, generally indicated at 45. This bayonet type mounting is electrically connected to ground through a metallic support member 46 which is screwed into tubular housing 30 as shown in Figure 4. An electric lead 48 connected to a battery (not shown) energizes light bulb 28 through contact 50 which is resiliently biased against light bulb 28 by means of a spring 52.

The translucent member 36 may be mounted in tubular housing 30 in any well known manner. In the preferred embodiment of this invention, the translucent member is press fit into a collar 37 which is screwed into tubular housing 30 as shown in Figure 4.

As shown in Figure 2, the hydraulic shift control shaft is in the drive position (indicated by the letter D on the indicating dial) when the control lever 18 is in the position shown in full lines. The hydraulic shift control shaft is in the reverse position, indicated by R on the indicating dial, when the control lever 18 is in the position indicated by dot and dash lines in Figure 2.

The face 40 of the translucent member, which is seen by the driver, may be covered or formed to give any desired illuminated shape. As shown, the face 40 appears as an illuminated circle with the indicating finger 26 located centrally in the illuminated circle. The use of Lucite, or some other plastic for the translucent member 36 is especially desirable since the light, although readily transmitted, is diffused by the material itself. This eliminates glare and produces a soft, but efficient illumination.

Thus, it can be seen that I have provided an indicating device for a hydraulic-drive control shaft of an automobile which when used at night clearly indicates the position of said control shaft and illuminates the position indicating means of said control shaft, without disturbing the automobile operator by glare from the source of illumination.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. In combination, an automobile hydraulic shift indicator comprising a translucent position member having a plurality of position markings thereon and being fixedly mounted, a hydraulic shift control shaft extending transverse to said position member and adapted to be pivoted about its axis, a pointer attached to and movable with said control shaft, said pointer being positioned behind said translucent position member and visible therethrough in daylight, the alignment of said pointer with a particular position marking indicating the position of said control shaft; and means mounted on and movable with said control shaft for indicating and illuminating the particular position marking corresponding to the position of said control shaft, said means comprising a light source, a light conducting rod having one end thereof exposed to said light source and the other end thereof positioned behind said translucent position member, whereby the light transmitted through said other end of said light conducting rod illuminates the particular position being indicated, said other end of said light conducting rod having a recess formed therein, and a portion of said pointer being positioned in said recess and adapted to engage the walls of the recess to restrict lateral displacement of the light conducting rod.

2. In combination, an automobile hydraulic shift indicator comprising a translucent position member having a plurality of position markings thereon and being fixedly mounted, a hydraulic shift control shaft adapted to be pivoted about its axis, a pointer attached to and movable with said control shaft, said pointer being positioned behind said translucent position member and visible therethrough in daylight, the alignment of said pointer with a particular position marking indicating the position of said control shaft; and an illuminated position indicator mounted on and rotatable with said control shaft, said illuminated position indicator comprising an opaque housing, a light source mounted within said housing, a light conducting rod having one end thereof inserted in said housing and exposed to said light source and the other end grooved to receive therein the pointer, opaque material covering the longitudinal sides of the light conducting rod, whereby only the extended end of said light conducting rod which is associated with said pointer appears illuminated, the extended end of said light conducting rod being positioned immediately behind said translucent position member, whereby said extended illuminated end of the light conducting rod may be viewed through said translucent position member and whereby the light emitted from said extended end of the light conducting rod illuminates said pointer and the position being indicated.

WALDO ANDREW GUNDERSON.

References Cited in the file of this patent

UNITED STATES PATENTS

| Number | Name | Date |
|---|---|---|
| 2,071,284 | Hyland | Feb. 16, 1937 |
| 2,290,278 | Failla | July 21, 1942 |

FOREIGN PATENTS

| Number | Country | Date |
|---|---|---|
| 143,453 | Australia | Nov. 11, 1935 |
| 419,305 | Great Britain | Nov. 9, 1934 |